United States Patent

Scales et al.

[11] 3,913,988
[45] Oct. 21, 1975

[54] JOURNAL BEARING AND METHOD UTILIZING HIGH CARBON SURFACE

[75] Inventors: Stanley R. Scales; Richard B. Prince, both of Houston, Tex.

[73] Assignee: Hughes Tool Company, Houston, Tex.

[22] Filed: Nov. 25, 1974

[21] Appl. No.: 527,110

Related U.S. Application Data

[62] Division of Ser. No. 261,754, June 12, 1974.

[52] U.S. Cl. ............... 308/8.2; 175/227; 308/241
[51] Int. Cl.² ...................................... F16C 19/00
[58] Field of Search ............... 308/8.2, 239, 241; 184/1 E; 252/26; 175/227, 229

[56] References Cited
UNITED STATES PATENTS

| | | | |
|---|---|---|---|
| 3,235,316 | 2/1966 | Whanger | 308/8.2 |
| 3,275,389 | 9/1966 | Neilson et al. | 308/241 X |
| 3,361,494 | 1/1968 | Galle | 308/8.2 |
| 3,784,264 | 1/1974 | Jackson | 308/8.2 |

Primary Examiner—M. Henson Wood, Jr.
Assistant Examiner—Gene A. Church
Attorney, Agent, or Firm—Robert A. Felsman

[57] ABSTRACT

Disclosed herein are bearings and methods of treatment especially suitable for friction or plain bearings in earth boring drill bits. The surface of such a bearing is carburized and heat treated to produce extremely high surface carbon such that free carbides occur at the surface. The steel bearings disclosed have a surface carbon content after treatment higher than 0.9% (by weight) to achieve the free carbides. The method for producing the desired high surface carbon in the bearing involves the initial step of heating the bearing in a gas carburizing furnace containing an atmosphere with a high carbon potential. Then the bearing is quenched directly from a high carbon potential atmosphere. Alternatively the bearing may be carburized by the "pack" carburizing method and subsequently using a copper plating or equivalent during hardening to prevent loss of the high surface carbon. In either instance the high carbon surface performs better if treated with a sacrificial, solid lubricant of soft metal or a metallic compound that breaks in the surface during initial operation.

12 Claims, 2 Drawing Figures

JOURNAL BEARING AND METHOD UTILIZING HIGH CARBON SURFACE

CROSS REFERENCE TO RELATED APPLICATION

This is a division of application Serial No. 261,754, filed June 12, 1974.

BACKGROUND OF THE INVENTION

1. Field of the Invention:

This invention relates in general to the treatment of steel bearing surfaces, and in particular to steel friction or plain bearings especially adapted for earth boring drill bits in which special treatments are utilized to achieve a carburized case with a high carbon content surface to improve resistance to galling.

2. Description of the Prior Art:

In the earth boring industry the original rolling cutter type drill bit had steel friction type bearings with carburized cases having a relatively low surface carbon content. The carburizing technique in those days utilized what is commonly known as "pack" carburizing. Such procedures did not produce carburized cases with high surface carbon content because the bearing members were hardened from a non-carburizing atmosphere in order to prevent unwanted carburization of the surfaces to be subsequently machined or welded.

More recently, anti-friction bearings having balls and rollers were utilized in rolling cutter type drill bits. These bearings had case hardened surfaces produced by using either pack carburizing or gas carburizing. In those bits utilizing pack carburizing, carburized cases with high carbon surface contents were not obtained for the reason explained above. Although possible, it is advisable to avoid high surface carbon contents in antifriction bearing bits when carburizing in a gas atmosphere because fatigue spalling more frequently occurs in parts subjected to multiple stress reversals when the carburized surface carbon content is high. Since antifriction drill bit bearings are subjected to excessively high stresses and many stress reversals, the high surface carbon contents are avoided.

SUMMARY OF THE INVENTION

The invention may be summarized as an earth boring drill bit and method of production having at least one steel plain or friction type bearing surface carburized and hardened in such a manner producing extremely high surface carbon. The surface carbon is sufficiently high that free carbides are produced at the surface. Depending upon the type of steel and heat treatment following carburization, the free carbides may be visible during microscopic examination as distinctive microconstitutents, or may be so finely dispersed that they cannot be resolved in normal microscopic examination. In either situation there is a substantial quantity of free carbides. To obtain free carbides at the surface of the bearing the carbon content at the surface should exceed 0.9% (by weight). Free carbides means more specifically a surface having an average carbon content higher than about 0.9% to give a combination of a solid solution of gamma iron (carbon dissolved in iron) and free carbides that do not go into solution when the steel is heated slightly above the eutectoid temperature of about 1350° F, depending upon alloy content. Ideally, the surface carbon content is as high as practicable, for example, 1.20% for AISI 8720 steel and SAE EX30 or 1.00% for AISI 4815 steel. In steel friction bearings intended for earth rock bit usage, the high surface carbon content produces an exceptionally gall resistant surface. Ideally, the high carbon surface and/or sometimes the opposing surface, which may not have high surface carbon, are provided with a sacrificial, solid lubricant such as a soft metal or a metallic compound. The above as well as other objects, features and advantages of the invention will become more fully apparent in the following detailed description.

DESCRIPTION OF THE PREFERRED EMBODIMENT

Figure 1:
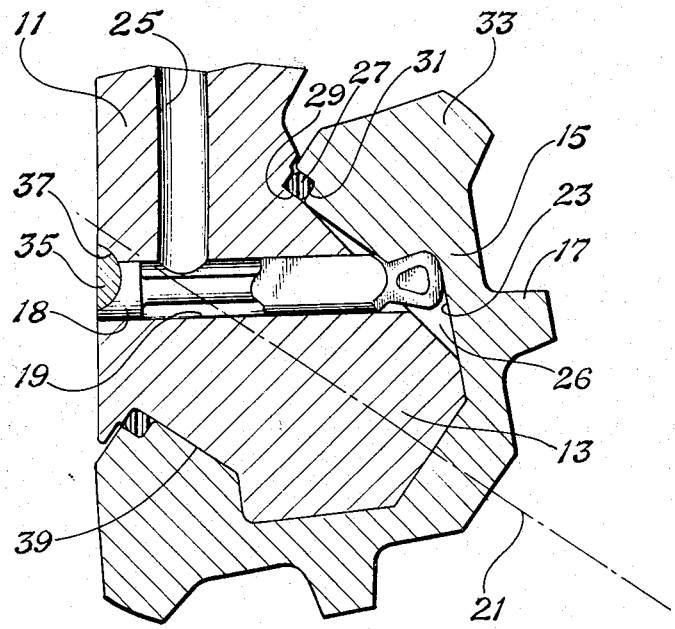
FIG. 1 is a fragmentary side elevation view in longitudinal section illustrating a typical earth boring drill bit having plain or friction bearing surfaces to support a cutter that rotates against a bore hole bottom.

With reference to FIG. 1 the numeral 11 designates the body or head section of an earth boring drill bit which includes a cantilevered pin or journal 13 that supports a rotatable, generally cone-shaped cutter 15 having teeth 17.

The bearing configuration illustrated in FIG. 1 is completely of the plain or friction type, utilizing a plug retainer 18 extending through a drill hole 19 formed obliquely relative to the axis 21 of the bearing and into a mating groove 23 formed concentrically with the rotational axis 21.

A lubrication passageway 25 extends from a lubrication reservoir (not shown) in an upper portion of the bit body, the passageway extending partially through the retainer pin 18 and into a space 26 between the cantilevered journal 13 and cutter 15.

An o-ring 27, or other suitable form of seal means, is confined between a portion 29 of the cantilevered journal 13 and the walls of a groove 31 formed preferably in the cutter 15. The retainer pin 18 is secured in position by weldment 35 in a receiving depression 37 formed in the bit body 11 and in one end of plug retainer 18.

Figure 2:
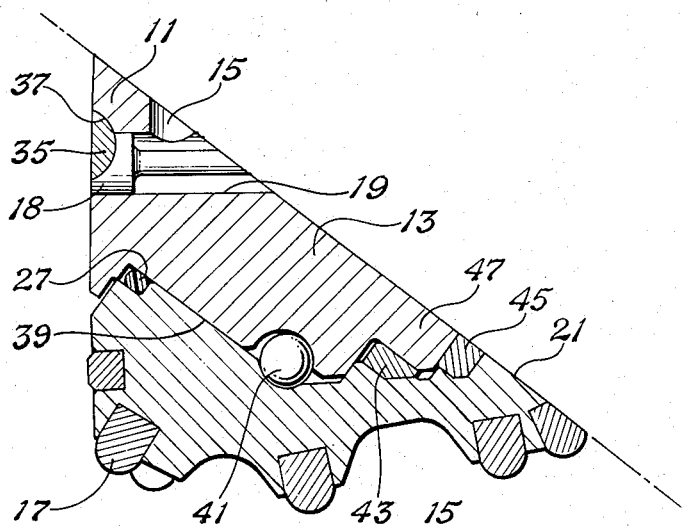
FIG. 2 is a fragmentary side elevation view in longitudinal section that illustrates the lower one half of another of the many alternate forms of bearings to which the invention may be applied.

The invention may be applied to bearings having a combination of friction and anti-friction bearings means, such as shown in FIG. 2. This bearing has friction surfaces that engage at 39, an anti-friction ball bearing 41, and additional friction bearing surfaces defined by a bushing 43 and a thrust button 45 secured in the rotatable cutter 15 to engage a pilot portion 47 of the journal 13. The rotatable cutter 15 has in this instance teeth 17 of sintered tungsten carbide that protrude from confining apertures in the cutter to illustrate that the invention is not limited in its broadest aspects of any particular type of cutter.

An earth boring drill bit had its plain or friction bearing surfaces such as those 39 shown in FIG. 1 and 2 carburized and heat treated to produce high surface carbon in accordance with the principles of the invention as follows:

A drill bit head section having a bearing pin form of AISI 8720 steel was first heated after copper plating all except the selected friction bearing surface to a temperature of 1700° to 1710° F. in a gas carburizing furnace containing an atomsphere with a carbon potential of 1.35%. The head section was maintained in the furnace at these conditions for approximately nine hours.

Next, the head section was cooled in the same carburizing atmosphere for a period of approximately twenty minutes to below about 800° F. and then cooled to room temperature in air. This prevents loss of the surface carbon.

For hardening purposes, the head section was then reheated to 1500° to 1510° F. in a furnace having a carburizing atmosphere with a carbon potential of 1.00% to prevent substantial loss of surface carbon. The head section was held at this temperature under these conditions for a period of from 30 to 45 minutes.

Next the head section was quenched in agitated oil directly from the carburizing atmosphere for a period of approximately 30 minutes. The oil temperature during this procedure was maintained at a temperature in a range from 70° to 140° F.

After quenching, the head section was then washed in water containing detergent for a period of approximately 10 minutes at a temperature of approximately 150°, although temperature is not particularly critical.

Then, the head section was tempered in an air atmosphere for approximately 1 hour at a temperature of 325° to 340° F.

The carburized case of the bearing of the head section treated above was analyzed and found to have a surface carbon content of 1.21%. The bearing pin of another head section so treated was found to have a surface carbon content of 1.27%.

As is commonly known in the drill bit industry, selected areas of the head sections are protected from carburization with copper plating about 0.002 inches thick. This is important also where some of the bearing means are of the anti-friction type, as shown in FIG. 2, which are detrimentally affected by high surface carbons in the range herein disclosed. Also, sharp corners should not have high surface carbon to minimize the generation of fatigue cracks. Other methods to prevent carburization of selected surfaces such as the use of stop-off paint are well known in the art.

The carbon potential of the carburizing atmosphere may be less than the 1.35% specified above but should not be below about 1.10% to satisfactorily obtain 0.9% surface carbon on the bearing surface. The 0.9% value represents an average value since there is generally some variation of carbon content across the surface. When hardening from a carburizing atmosphere, which may be the original or an additional such atmosphere, the carbon potential should not fall below 0.9% to prevent substantial loss of free carbides at the surface.

It is advantageous when friction bearings have high surface carbon produced according to the invention, to treat at least one of the bearing surfaces with a sacrificial, solid lubricant that ideally is a soft metal or a metallic compound. This treatment, which may wear rapidly during initial use of the bearing, enables the breaking-in of the hard, high carbon surface in a manner that substantially lengthens the life of the bearing. For the AISI 8720 steel that is carburized as explained above, the best sacrificial, solid lubricant tested thusfar is iron sulfide. Iron sulfide treatment is sometimes known as the "Caubet" treatment and is explained in detail in U.S. Pat. No. 3,467,585. The cutter 15 was formed of AISI 4815 steel, was carburized and hardened as explained above, and had its bearing surfaces ground to insure concentricity within permissible tolerance. This grinding results generally in a surface carbon of about 0.8% or below. This combination was the "Caubet" treated 8720 steel journal, carburized as explained above, yielded best results when utilized in earth boring drill bits.

A second example of a satisfactory sacrificial, solid lubricant for a carburized journal surface involves treatment of the high surface carbon bearing surface with a manganese phosphate. The carburized bearing was immersed for a period of 20 to 25 minutes in an essentially saturated solution of manganese phosphate in the presence of a slight excess of phosphoric acid, the solution being heated and maintained at a temperature of 200° to 210° F.

Other sacrificial solid lubricant treatments include coating of copper, silver, cadmium, alloys thereof, or other of the soft anti-galling metals in the manners commonly known in the art. However, metallic compounds such as manganese, iron phosphate or iron sulfide are the most advantageous since they diffuse into the steel of the bearing and in effect become an integral part thereof.

The iron sulfide surface treatment is especially advantageous for another reason; namely that it may be used in those areas of the journal and cutter engaged by the seal means 27. The iron sulfide in the alloy steel surface has a smooth low friction surface condition that is not detrimental to seal life, and may even prolong it. When treated with manganese phosphate the surface tends to be detrimental to seal means such as O-rings. Therefore the seal areas should be protected from the treatment by suitable means such as a lacquer coating for example.

It is possible in the carburizing step explained above that the time of carburization may be greater or less than 9 hours. The length of time for carburization affects primarily the depth of carburization, although to obtain high surface carbon it is necessary to carburize for a certain minimum period of time, as for example 6 hours. A bearing surface treated in accordance with the foregoing method produced free carbides at the surface. Head sections with these bearing surfaces were assembled into a sealed and lubricated drill bit having a rotatable cone also having carburized steel bearing surfaces and showed improved bearing life when compared with known prior art drill bits.

It should be understood that the surface carbon content explained above occurs in an extremely shallow depth from the surface. The surface carbon content is measured from a cut that is 0.005 inch deep and represents an average depth of 0.0025 inch. The carbon gradient falls rapidly from this shallow depth, but it has been found that this is the important depth in which galling resistance must be improved. Any additional bearing life after the bearing wears 0.005 inch is extremely short. Therefore, even though the carbon gradient falls rapidly from the surface, treatment of bearing surfaces in accordance with the foregoing method improves galling resistance significantly. A secondary advantage of the invention is that the free carbides improves the wear resistance of seal surfaces, such as the o-ring surface shown in the drawing.

By way of a second example an AISI 4815 type steel head section was treated in accordance with the foregoing method and was found to have a bearing surface carbon content of 1.00%. Testing of this bit under actual drilling conditions showed that its bearing life was improved.

Treatment of an additional steel such as an SAE EX30 in accordance with the foregoing method yielded a surface carbon content similar to the example given above in connection with the AISI 8720 steel.

While the invention has been disclosed in but a few of its forms, it should be apparent to those skilled in the art that it is not so limited but is susceptible to various changes and modifications without departing from the spirit thereof. For example earth boring drill bits having friction bearing surfaces that are pack carburized to obtain free carbides at the surface fall within the broad scope of the invention. When using pack carburization, it is not feasible to quench directly from the carburizing atmosphere. Thus, the quenching should be done after the bearing surface has been coated with copper or given other treatment to prevent the loss of free carbides at the surface when heating the surface in a low carbon atmosphere to pre-quench temperatures. Also, changes in the method sequences and steps will occur to those of average skill in view of the teaching herein.

We claim:

1. In an earth boring drill bit having at least one sealed and lubricated bearing surface that engages a mating surface in a rotatable cutter, the improvement which comprises:
a carburized and hardened steel journal having free carbides at the surface thereof; and a cutter having a friction bearing surface rotatably secured to said journal.

2. The drill bit defined by claim 1 in which has at least one of said bearing surfaces at least one of the antigalling solid lubricants.

3. The drill bit defined by claim 2 in which the antigalling solid lubricant comprises a soft metal.

4. The drill bit defined by claim 2 in which the antigalling solid lubricant comprises a metallic compound.

5. The drill bit defined by claim 2 in which the antigalling solid lubricant comprises iron sulfide.

6. The drill bit defined by claim 2 in which the antigalling solid lubricant comprises manganese iron phosphate.

7. In an earth boring drill bit having at least one sealed and lubricated bearing surface that engages a mating surface in a rotatable cutter, the improvement comprises:
a carburized and hardened steel journal bearing having a surface carbon content that averages higher than 0.9%; and a carburized and hardened steel, friction mating surface in said cutter.

8. The drill bit defined by claim 7 which has at least at one of said bearing surfaces at least one of the antigalling solid lubricants.

9. The drill bit defined by claim 8 in which the antigalling solid lubricant comprises a soft metal.

10. The drill bit defined by claim 8 in which the antigalling solid lubricant comprises a metallic compound.

11. The drill bit defined by claim 8 in which the antigalling solid lubricant comprises iron sulfide.

12. The drill bit defined by claim 8 in which the antigalling solid lubricant comprises manganese iron phosphate.

* * * * *